United States Patent
Huang et al.

(10) Patent No.: US 10,293,416 B2
(45) Date of Patent: May 21, 2019

(54) HYDRAULIC ROLLING-CUT SHEARS

(71) Applicant: Taiyuan University of Science and Technology, Taiyuan (CN)

(72) Inventors: Qingxue Huang, Taiyuan (CN); Zhibing Chu, Taiyuan (CN); Lifeng Ma, Taiyuan (CN)

(73) Assignee: TAIYUAN UNIVERSITY OF SCIENCE AND TECHNOLOGY, Taiyuan (CN)

( * ) Notice: Subject to any disclaimer, the term of this patent is extended or adjusted under 35 U.S.C. 154(b) by 0 days.

(21) Appl. No.: 15/397,756

(22) Filed: Jan. 4, 2017

(65) Prior Publication Data

US 2017/0173709 A1    Jun. 22, 2017

Related U.S. Application Data

(63) Continuation-in-part of application No. PCT/CN2014/095530, filed on Dec. 30, 2014.

(30) Foreign Application Priority Data

Jul. 4, 2014    (CN) .......................... 2014 1 0316387
Nov. 19, 2014   (CN) .......................... 2014 1 0665481

(51) Int. Cl.
*B23D 15/08* (2006.01)
*B23D 15/12* (2006.01)

(52) U.S. Cl.
CPC ............. *B23D 15/08* (2013.01); *B23D 15/12* (2013.01)

(58) Field of Classification Search
CPC ...... B23D 15/00; B23D 15/002; B23D 15/04; B23D 15/06; B23D 15/08; B23D 15/12; Y10T 83/705; Y10T 83/7055; Y10T 83/706; Y10T 83/7065
USPC .................................................... 83/783–786
See application file for complete search history.

(56) References Cited

U.S. PATENT DOCUMENTS

| | | | | |
|---|---|---|---|---|
| 1,986,685 A | * | 1/1935 | Soderberg | B23D 15/08 83/644 |
| 2,655,192 A | * | 10/1953 | La Lone | B21D 5/0272 72/331 |
| 3,316,791 A | * | 5/1967 | Hamacher | B23D 15/08 83/566 |

(Continued)

*Primary Examiner* — Jason Daniel Prone
*Assistant Examiner* — Richard D Crosby, Jr.
(74) *Attorney, Agent, or Firm* — Matthias Scholl P.C.; Matthias Scholl

(57) ABSTRACT

A hydraulic rolling-cut shears, including: a horizontally disposed hydraulic cylinder; a shear mechanism including an upper tool post and a lower tool post; a linkage mechanism including a first upper connecting rod, a first lower connecting rod, a second upper connecting rod, a second lower connecting rod, and a synchronous connecting rod; and supports including a hydraulic cylinder support and a guiding rod support. The hydraulic cylinder is hinged to and disposed on the hydraulic cylinder support through a first pin. One end of the first upper connecting rod, one end of the first lower connecting rod, and one end of the synchronous connecting rod are hinged to one end of a piston rod of the hydraulic cylinder via a second pin. The first upper connecting rod, the synchronous connecting rod, and the first lower connecting rod are disposed at one side of the hydraulic cylinder support.

3 Claims, 5 Drawing Sheets

(56) References Cited

U.S. PATENT DOCUMENTS

| | | | | |
|---|---|---|---|---|
| 3,530,761 A * | 9/1970 | Erwin | B23D 15/14 | 83/625 |
| 3,616,525 A * | 11/1971 | Barthel | B21D 5/029 | 29/560 |
| 3,691,890 A * | 9/1972 | Kuchyt | B23D 15/08 | 83/624 |
| 3,733,466 A * | 5/1973 | Krumrey | G06K 1/06 | 101/19 |
| 3,908,496 A * | 9/1975 | Moelbert | B23D 15/14 | 83/157 |
| 4,003,281 A * | 1/1977 | Kumpf | B26D 1/205 | 83/477.2 |
| 4,122,740 A * | 10/1978 | Maltby | B23D 15/08 | 83/646 |
| 4,204,450 A * | 5/1980 | Le Guelennec | B23D 15/08 | 83/461 |
| 4,328,729 A * | 5/1982 | Bartesaghi | B26D 1/305 | 83/568 |
| 4,646,599 A * | 3/1987 | Benedict | B21D 45/006 | 83/131 |
| 5,066,152 A * | 11/1991 | Kuzuya | B26D 1/0006 | 346/24 |
| 5,285,670 A * | 2/1994 | Thomas | B21B 1/34 | 226/181 |
| 5,634,387 A * | 6/1997 | Squires | B23D 15/06 | 83/468 |
| 5,718,528 A * | 2/1998 | Halket | B26D 1/025 | 400/615.2 |
| 6,161,460 A * | 12/2000 | Johnson | B23D 15/00 | 83/821 |
| 7,066,222 B2 * | 6/2006 | Yontrarak | B27L 5/06 | 144/162.1 |
| 8,505,426 B2 * | 8/2013 | Christoforou | B23D 15/14 | 83/617 |
| 2001/0042431 A1 * | 11/2001 | Epskamp | B23D 15/00 | 83/694 |
| 2006/0060050 A1 * | 3/2006 | Heitze | B23D 15/08 | 83/515 |
| 2011/0259164 A1 * | 10/2011 | Clark | B23D 15/14 | 83/13 |
| 2017/0173709 A1 * | 6/2017 | Huang | B23D 15/08 | |

* cited by examiner

HYDRAULIC ROLLING-CUT SHEARS

CROSS-REFERENCE TO RELATED APPLICATIONS

This application is a continuation-in-part of International Patent Application No. PCT/CN2014/095530 with an international filing date of Dec. 30, 2014, designating the United States, now pending, and further claims foreign priority benefits to Chinese Patent Application No. 201410316387.1 filed Jul. 4, 2014, and to Chinese Patent Application No. 201410665481.8 filed Nov. 19, 2014. The contents of all of the aforementioned applications, including any intervening amendments thereto, are incorporated herein by reference.

BACKGROUND OF THE INVENTION

Field of the Invention

The invention relates to a hydraulic rolling-cut shears.

Description of the Related Art

Typically, there are two kinds of rolling-cut shears: mechanical shears and hydraulic shears.

The mechanical shears are bulky, require high machining and assembling accuracy, have complex transmission system, high power consumption, high production, operation, and maintenance costs.

The hydraulic shears include two horizontally disposed hydraulic cylinders configured to drive the linkage mechanism. The two hydraulic cylinders are controlled by a servo control system, which requires high-level hardware to ensure the stability of the control system. Thus, the hydraulic shears are expensive and costly to maintain.

SUMMARY OF THE INVENTION

In view of the above-described problems, it is one objective of the invention to provide a rolling-cut shears driven by a single hydraulic cylinder.

To achieve the above objective, in accordance with one embodiment of the invention, there is provided a hydraulic rolling-cut shears, comprising: a horizontally disposed hydraulic cylinder, a shear mechanism, a linkage mechanism, and supports.

The hydraulic cylinder is hinged to and disposed on a hydraulic cylinder support through a first pin. An end of a piston rod of the hydraulic cylinder is hinged to one end of a first upper connecting rod, one end of a first lower connecting rod, and one end of a synchronous connecting rod via a second pin. The first upper connecting rod, the synchronous connecting rod, and the first lower connecting rod are disposed at one side of a hydraulic cylinder support, and are disposed from top to bottom in that order. The other end of the synchronous connecting rod is hinged to one end of a second upper connecting rod and one end of a second lower connecting rod via a third pin. The second upper connecting rod and the second lower connecting rod are disposed at one side of the guiding rod support. The other end of the first upper connecting rod and the other end of the second upper connecting rod are hinged to an upper beam via a fourth pin. The other end of the first lower connecting rod and the other end of the second lower connecting rod are hinged to an upper tool post.

An angle between the first upper connecting rod and a perpendicular line is defined as $\beta$. An angle between the first lower connecting rod and the perpendicular line is defined $\beta_1$. An angle between the second upper connecting rod and the perpendicular line is defined as $\alpha$. An angle between the second lower connecting rod and the perpendicular line is defined as $\alpha_1$. One end of a guiding rod is hinged to the upper tool post, and the other end of the guiding rod is hinged to the guiding rod support. An angle between the guiding rod and a horizontal line is defined as $\varphi$, and $\varphi$ is 5 degrees.

When in use, the horizontally disposed hydraulic cylinder drives the first upper connecting rod, the first lower connecting rod, and the synchronous connecting rod, and the synchronous connecting rod operates to transmit power to the second upper connecting rod and the second lower connecting rod, therefore, a synchronous movement of the first upper connecting rod, the first lower connecting rod, the second upper connecting rod, the second lower connecting rod, and the synchronous connecting rod is achieved, and the upper tool post is driven to conduct rolling cut. Whether the piston rod is stretched out or retracted, the rolling cut on metal sheet is conducted. The first upper connecting rod, the first lower connecting rod, the second upper connecting rod, and the second lower connecting rod are not in alignment with one another.

In a class of this embodiment, structure parameters of the rolling-cut shear driven by a single hydraulic cylinder during the rolling cut are as follows:

A distance H from a first hinge joint connecting the first upper connecting rod and the upper beam to a second hinge joint connecting the second upper connecting rod and the upper beam is between 1000 and 5000 mm.

The first upper connecting rod and the first lower connecting rod have an equal length M, and M is between 200 and 2500 mm.

The second upper connecting rod and the second lower connecting rod have an equal length N, and N is between 200 and 2500 mm.

The angle $\beta$ between the first upper connecting rod and the perpendicular line and the angle $\beta_1$ between the first lower connecting rod and the perpendicular line are equal, and are between −25 degrees and 25 degrees.

The angle $\alpha$ between the second upper connecting rod and the perpendicular line and the angle $\alpha_1$ between the second lower connecting rod and the perpendicular line are equal, and are between −35 degrees and 35 degrees.

Advantages of the hydraulic rolling-cut shears according to embodiments of the invention are summarized as follows:

1. The rolling-cut shear uses one horizontally disposed hydraulic cylinder to drive the four connecting rods, achieving the synchronous movement of the four connecting rods. The rolling-cut shear performs the rolling cut under the control of the guiding rod. During the rolling cut, the hydraulic cylinder moves within the limit position under control, and no servo control system is required. The shear features a compact structure, and the hydraulic system and the control system have moderate costs and are convenient for maintenance.
2. During the rolling cut of the shear, the linkage mechanism has a good reinforcement effect; to be specific, the shear force of the hydraulic cylinder is twice the thrust force thereof, thus saving the energy and reducing the emission.
3. Whether the piston rod of the hydraulic cylinder is stretched out or retracted, the rolling cut on the metal sheet is conducted, which greatly improves the service efficiency of the shear.

Figure 1:
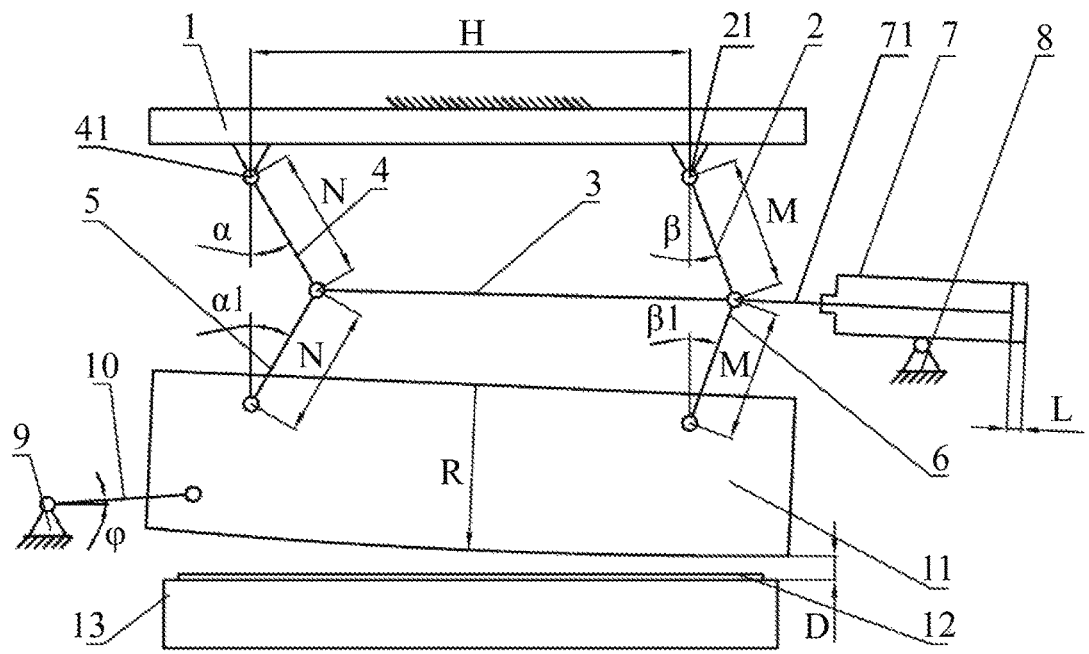
FIG. 1 is a schematic diagram of a rolling-cut shear driven by a single hydraulic cylinder in accordance with one embodiment of the invention.

In the drawings, the following reference numbers are used: 1. Upper beam; 2. First upper connecting rod; 21. First hinge joint; 3. Synchronous connecting rod; 4. Second upper connecting rod; 41. Second hinge joint 5. Second lower connecting rod; 6. First lower connecting rod; 7. Hydraulic cylinder; 71. Piston rod; 8. Hydraulic cylinder support; 9. Guiding rod support; 10. Guiding rod; 11. Upper tool post; 12. Metal sheet; and 13. Lower tool post.

DETAILED DESCRIPTION OF THE EMBODIMENTS

Example 1

Figure 2:
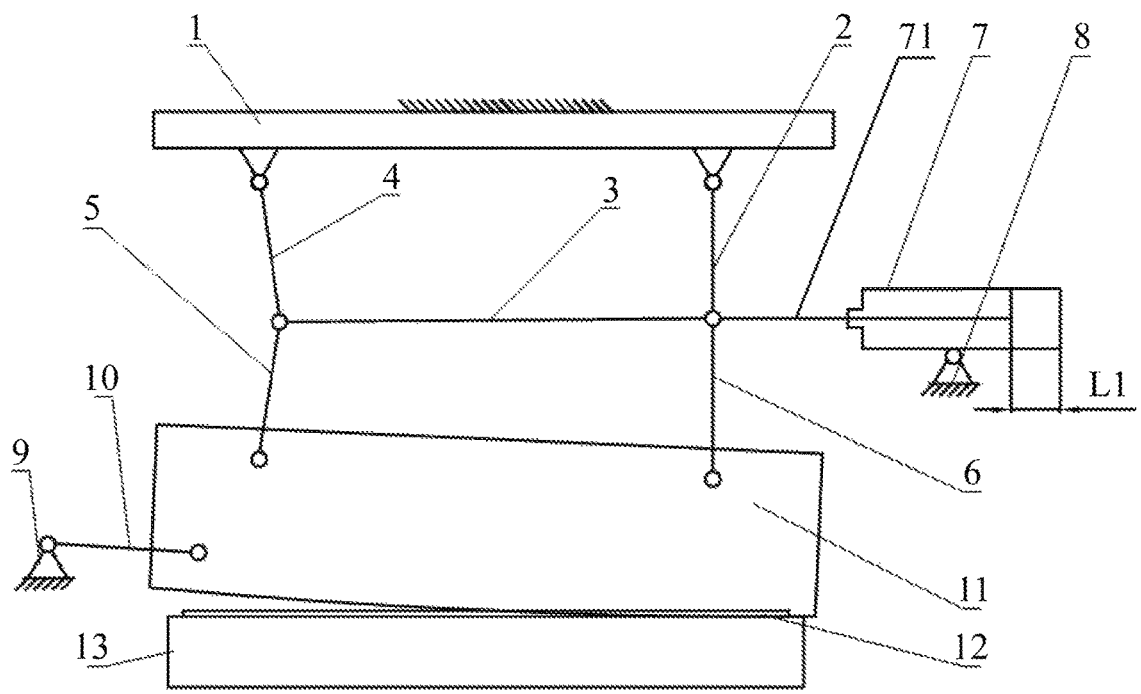
FIG. 2 is a diagram showing a cut-in process of a rolling-cut shear driven by a single hydraulic cylinder when a hydraulic cylinder is stretched out in accordance with one embodiment of the invention.
Figure 3:
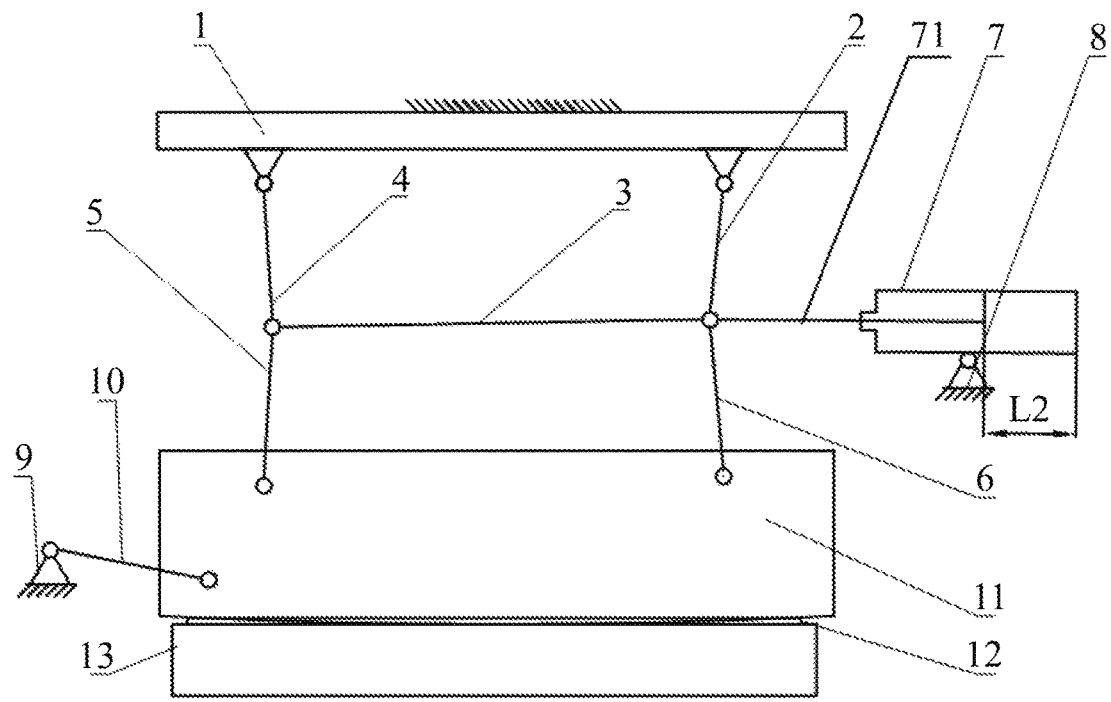
FIG. 3 is a diagram showing a rolling-cut process of a rolling-cut shear driven by a single hydraulic cylinder when a hydraulic cylinder is stretched out in accordance with one embodiment of the invention.
Figure 4:
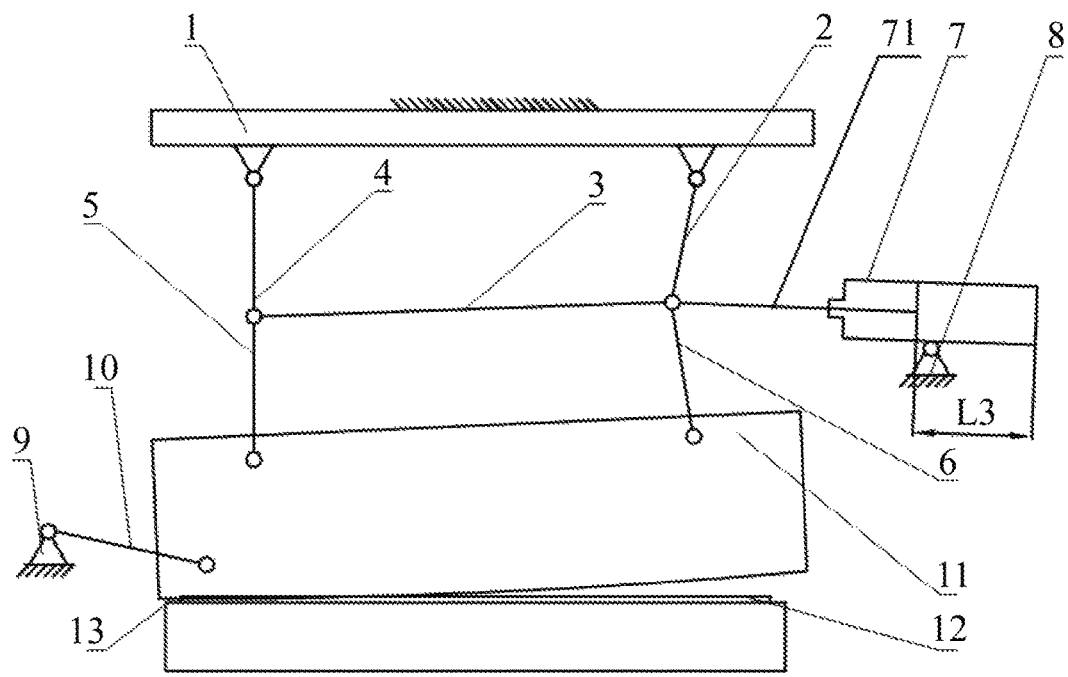
FIG. 4 is a diagram showing a cut-out process of a rolling-cut shear driven by a single hydraulic cylinder when a hydraulic cylinder is stretched out in accordance with one embodiment of the invention.
Figure 5:
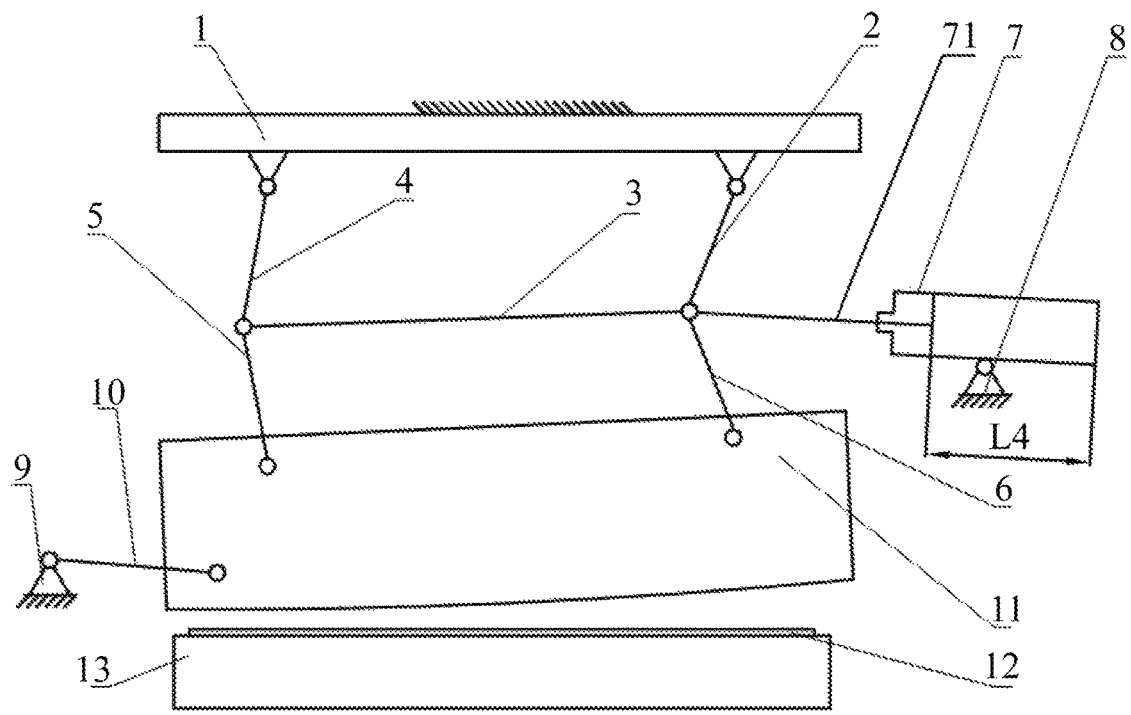
FIG. 5 is a diagram showing a cut-off process of a rolling-cut shear driven by a single hydraulic cylinder when a hydraulic cylinder is stretched out in accordance with one embodiment of the invention.
Figure 6:
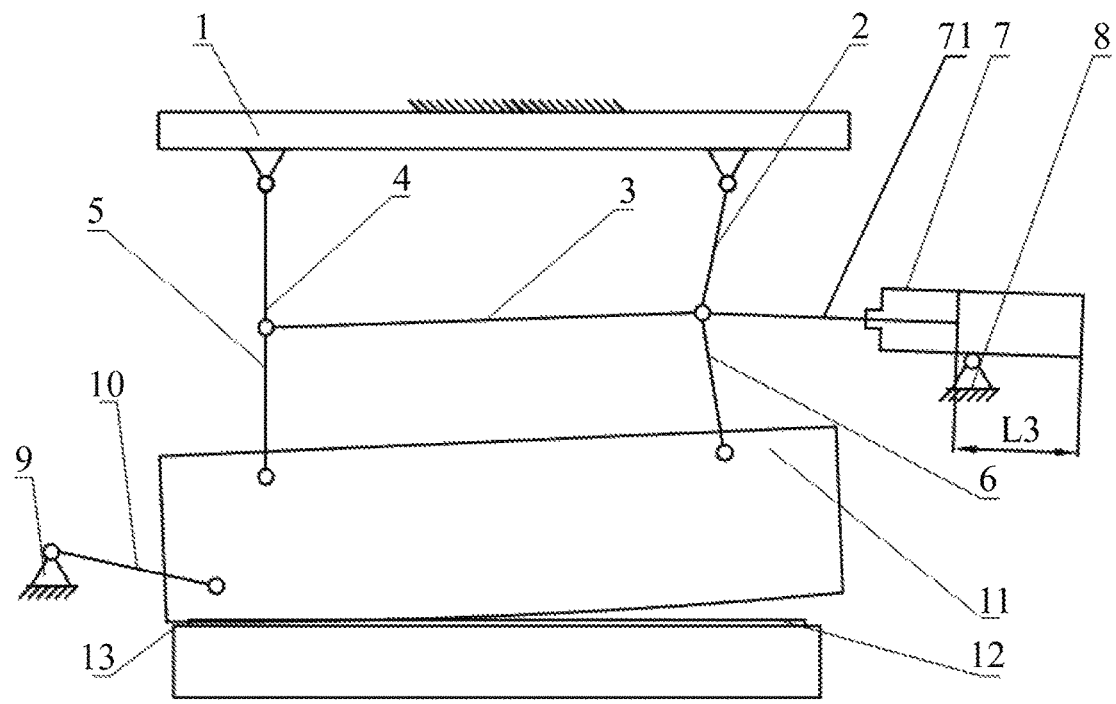
FIG. 6 is a diagram showing a cut-in process of a rolling-cut shear driven by a single hydraulic cylinder when a hydraulic cylinder is retracted in accordance with one embodiment of the invention.
Figure 7:
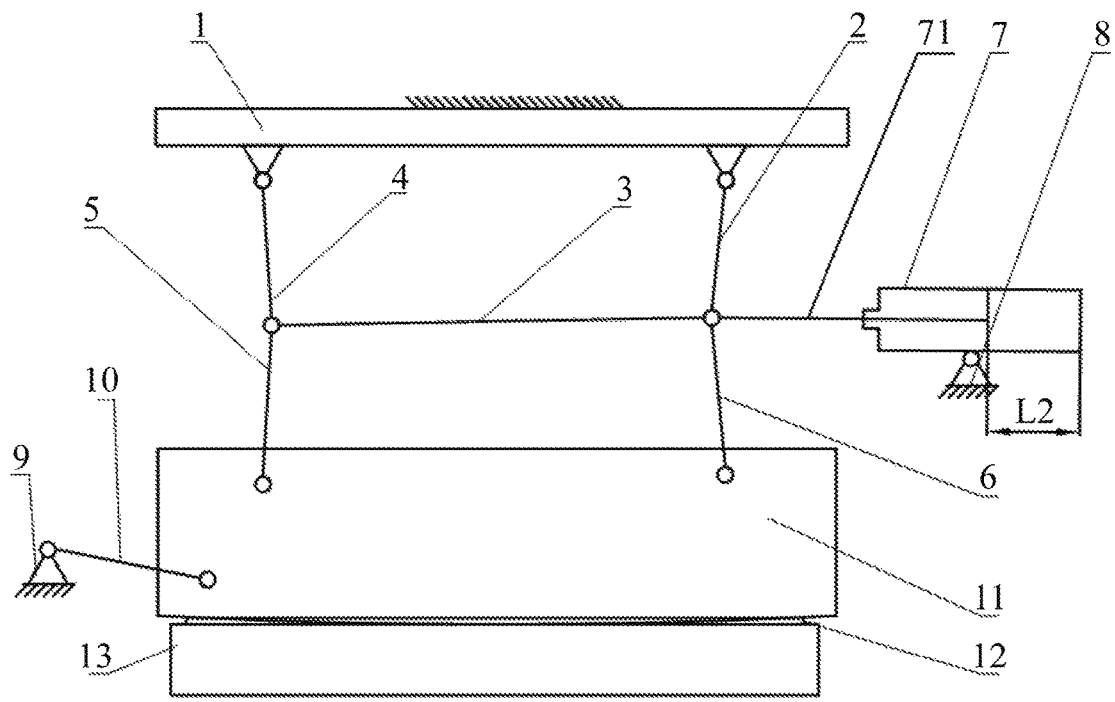
FIG. 7 is a diagram showing a rolling-cut process of a rolling-cut shear driven by a single hydraulic cylinder when a hydraulic cylinder is retracted in accordance with one embodiment of the invention.
Figure 8:
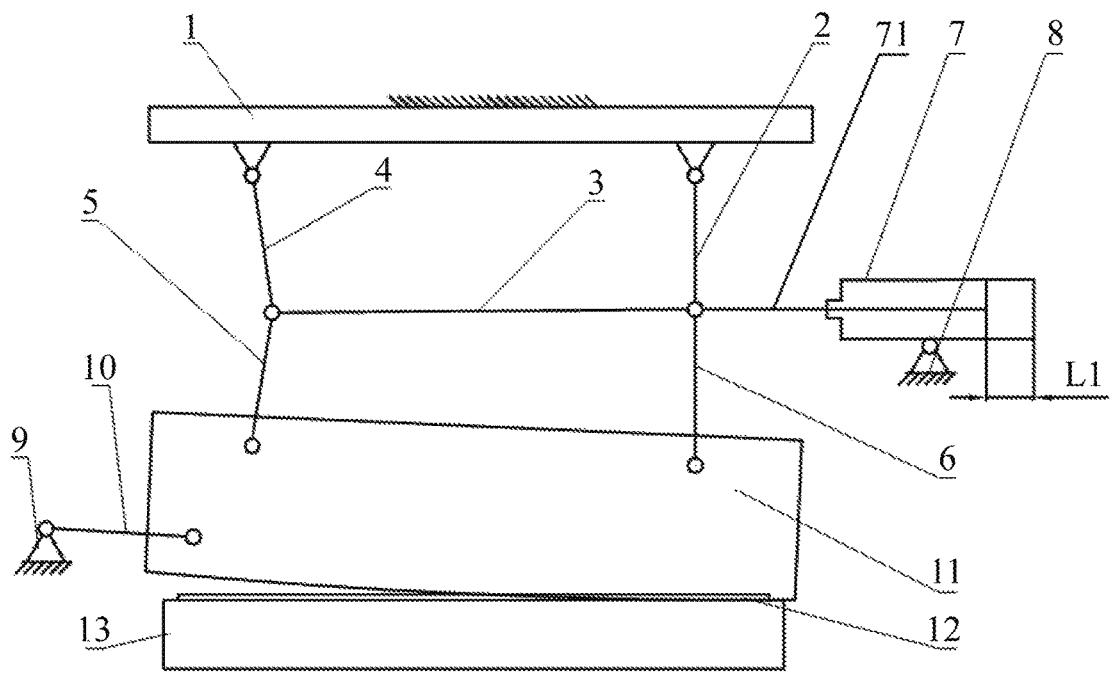
FIG. 8 is a diagram showing a cut-out process of a rolling-cut shear driven by a single hydraulic cylinder when a hydraulic cylinder is retracted in accordance with one embodiment of the invention.
Figure 9:
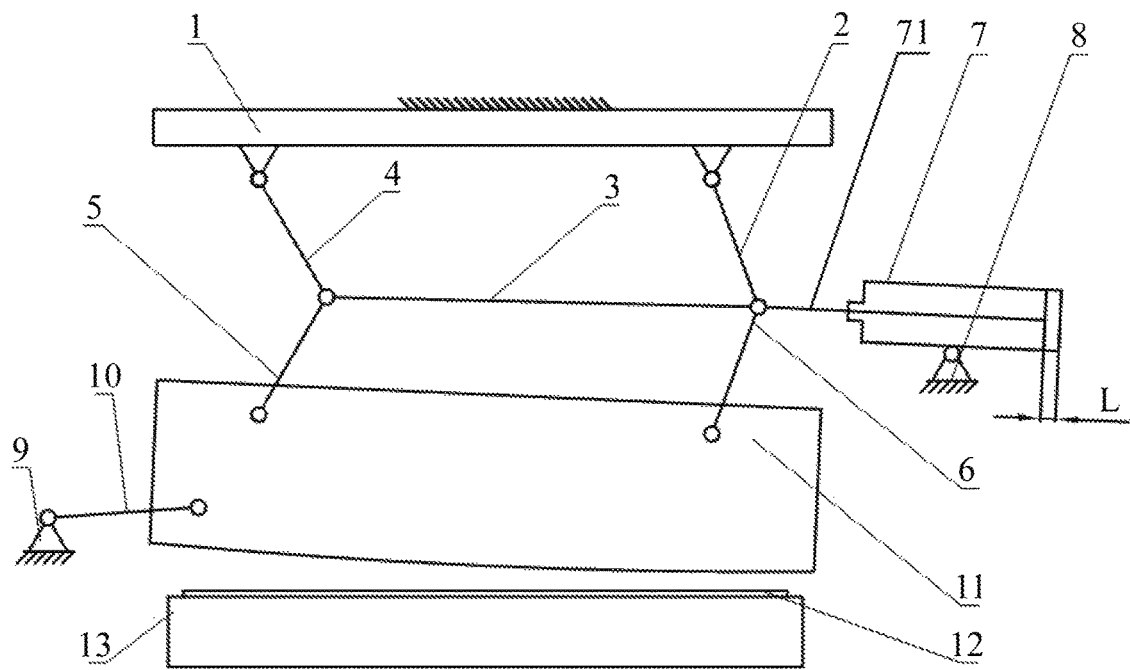
FIG. 9 is a diagram showing a cut-off process of a rolling-cut shear driven by a single hydraulic cylinder when a hydraulic cylinder is retracted in accordance with one embodiment of the invention.

As shown in FIGS. 1-9, a rolling-cut shear driven by a single hydraulic cylinder comprises: a horizontally disposed hydraulic cylinder, a shear mechanism, a linkage mechanism, and supports. The hydraulic cylinder 7 is hinged to and disposed on a hydraulic cylinder support 8 through a first pin. An end of a piston rod 71 of the hydraulic cylinder 7 is hinged to one end of a first upper connecting rod 2, one end of a first lower connecting rod 6, and one end of the synchronous connecting rod 3 via a second pin. The first upper connecting rod 2, the synchronous connecting rod 3, and the first lower connecting rod 6 are disposed at one side of the hydraulic cylinder support 8, and are disposed from top to bottom in that order. The other end of the synchronous connecting rod 3 is hinged to one end of the second upper connecting rod 4 and one end of the second lower connecting rod 5 via a third pin. The second upper connecting rod 4 and the second lower connecting rod 5 are disposed at one side of the guiding rod support 9. The other end of the first upper connecting rod 2 and the other end of the second upper connecting rod 4 are hinged to an upper beam 1 via a fourth pin. The other end of the first lower connecting rod 6 and the other end of the second lower connecting rod 5 are hinged to an upper tool post 11. An angle between the first upper connecting rod 2 and a perpendicular line is defined as $\beta$. The first upper connecting rod 2 is disposed at one side of the hydraulic cylinder support 8. An angle between the first lower connecting rod 6 and the perpendicular line is defined as $\beta_1$. The first lower connecting rod 6 is disposed at one side of the hydraulic cylinder support 8, and $\beta=\beta_1=-25°-25°$. An angle between the second upper connecting rod 4 and the perpendicular line is defined as $\alpha$. The second upper connecting rod 4 is disposed at one side of guiding rod support 9. An angle between the second lower connecting rod 5 and the perpendicular line is defined as $\alpha_1$. The second lower connecting rod 5 is disposed at one side of the guiding rod support 9, and $\alpha=\alpha_1=-35°-35°$. One end of a guiding rod 10 is hinged to the upper tool post 11, and the other end of the guiding rod 10 is hinged to the guiding rod support 9. An angle between the guiding rod 10 and a horizontal line is defined as $\varphi$, and $\varphi$ is 5 degrees. When the cutting begins, a distance from the piston rod 71 of the hydraulic cylinder 7 to a bottom of the hydraulic cylinder 7 is defined as L. The piston rod 71 of the hydraulic cylinder 7 is stretched out, and drives the first upper connecting rod 2, the first lower connecting rod 6, and the synchronous connecting rod 3 which are disposed at one side of the hydraulic cylinder support 8, and the synchronous connecting rod 3 operates to transmit power to the second upper connecting rod 4 and the second lower connecting rod 5 which are disposed at one side of the guiding rod support 9, therefore, a synchronous movement of the first upper connecting rod 2, the first lower connecting rod 6, the second upper connecting rod 4, and the second lower connecting rod 5 is achieved, and the upper tool post 11 is driven to conduct rolling cut, then the metal sheet 12 fixed at the lower tool post 13 is cut. As shown in FIG. 2, when the distance from the piston rod 71 of the hydraulic cylinder 7 to the bottom of the hydraulic cylinder 7 is L1, the sheer is in the cut-in process. As shown in FIG. 3, when the distance from the piston rod 71 of the hydraulic cylinder 7 to the bottom of the hydraulic cylinder 7 is L2, the sheer is in the rolling-cut process. As shown in FIG. 4, when the distance from the piston rod 71 of the hydraulic cylinder 7 to the bottom of the hydraulic cylinder 7 is L3, the sheer is in the cut-out process. As shown in FIG. 5, when the distance from the piston rod 71 of the hydraulic cylinder 7 to the bottom of the hydraulic cylinder 7 is L4, the sheer is in the cut-off process. The rolling cut can be conducted when the piston rod 71 of the hydraulic cylinder 7 is retracted, and as shown in FIG. 6, when the distance from the piston rod 71 of the hydraulic cylinder 7 to the bottom of the hydraulic cylinder 7 is L3, the sheer is in the cut-in process; as shown in FIG. 7, when the distance from the piston rod 71 of the hydraulic cylinder 7 to the bottom of the hydraulic cylinder 7 is L2, the sheer is in the rolling-cut process; as shown in FIG. 8, when the distance from the piston rod 71 of the hydraulic cylinder 7 to the bottom of the hydraulic cylinder 7 is L1, the sheer is in the cut-out process; and as shown in FIG. 9, when the distance from the piston rod 71 of the hydraulic cylinder 7 to the bottom of the hydraulic cylinder 7 is L, the sheer is restored to the initial state.

The first upper connecting rod 2, the first lower connecting rod 6, the second upper connecting rod 4, and the second lower connecting rod 5 are not in alignment with one another. The first upper connecting rod and the first lower connecting rod are disposed at one side of the hydraulic cylinder support 8, and the second upper connecting rod and the second lower connecting rod are disposed at one side of the guiding rod support 9. The angle between the first upper connecting rod 2 which is disposed at one side of the hydraulic cylinder support 8 and the perpendicular line is different from the angle between the second upper connecting rod 4 which is disposed at one side of the guiding rod support 9 and the perpendicular line, and the difference is between 5 degrees to 15 degrees.

Ranges of the key structure parameters of the sheer in the example are as follows:

A distance H from a first hinge joint 21 connecting the first upper connecting rod 2 and the upper beam 1 to a second hinge joint 41 connecting the second upper connecting rod 4 and the upper beam 1 is between 1000 and 5000 mm.

The first upper connecting rod 2 and the first lower connecting rod 6 have an equal length M, and M is between 200 and 2500 mm.

The second upper connecting rod 4 and the second lower connecting rod 5 have an equal length N, and N is between 200 and 2500 mm.

The angle β between the first upper connecting rod 2 and the perpendicular line and the angle $β_1$ between the first lower connecting rod 6 and the perpendicular line are equal, and are between −25 degrees and 25 degrees.

The angle α between the second upper connecting rod 4 and the perpendicular line and the angle $α_1$ between the second lower connecting rod 5 and the perpendicular line are equal, and are between −35 degrees and 35 degrees.

The ranges of optimized parameters of the rolling cut sheer driven by a single hydraulic cylinder in terms of different specifications are as shown in Table 1:

TABLE 1

| Shear specifications | H (mm) | M (mm) | N (mm) | $β, β_1$ $(β = β_1)$ | $α, α_1$ $(α = α_1)$ |
|---|---|---|---|---|---|
| Type 2000 | 1000-1800 | 200-850 | 200-850 | −25°-25° | −35°-35° |
| Type 2500 | 1200-2500 | 400-1100 | 400-1100 | −25°-25° | −35°-35° |
| Type 3200 | 1500-3200 | 550-1500 | 550-1500 | −25°-25° | −35°-35° |
| Type 4000 | 2000-4100 | 650-2000 | 650-2000 | −25°-25° | −35°-35° |
| Type 5000 | 2500-5000 | 700-2500 | 700-2500 | −25°-25° | −35°-35° |

Note:
1. The shear specifications are named according to the width dimensions (unit: mm) of the steel plate.
2. H is the distance from a first hinge joint 21 connecting the first upper connecting rod 2 and the upper beam 1 to a second hinge joint 41 connecting the second upper connecting rod 4 and the upper beam 1.
3. M is the length of the first upper connecting rod 2 and the first lower connecting rod 6.

N is the length of the second upper connecting rod 4 and the second lower connecting rod 5.

4. β is the angle between the first upper connecting rod 2 and the perpendicular line, and $β_1$ is the angle between the first lower connecting rod 6 and the perpendicular line.

5. α is the angle between the second upper connecting rod 4 and the perpendicular line, and $α_1$ is the angle between the second lower connecting rod 5 and the perpendicular line.

The invention claimed is:

1. A hydraulic rolling-cut shear, comprising:
a) a hydraulic cylinder, the hydraulic cylinder comprising a piston rod having a protruding end;
b) a shear mechanism, the shear mechanism comprising an upper tool post and a lower tool post; the upper tool post comprising a first cutting end and a second cutting end; the lower tool post comprising a sheet-supporting surface;
c) a linkage mechanism, the linkage mechanism comprising a first upper connecting rod, a first lower connecting rod, a second upper connecting rod, a second lower connecting rod, and a synchronous connecting rod; each of the first upper connecting rod, the first lower connecting rod, the second upper connecting rod, the second lower connecting rod, and the synchronous connecting rod comprising a first end and a second end;
d) a hydraulic cylinder support;
e) a guiding rod;
f) a guiding rod support; and
g) an upper beam; the upper beam comprising a beam surface;
wherein
the upper beam, the hydraulic cylinder support, the guiding rod support, and the lower tool post are fixedly connected and remain stationary in the hydraulic rolling-cut shear;
the hydraulic cylinder is hinged to and disposed on the hydraulic cylinder support;
the first end of the first upper connecting rod, the first end of the first lower connecting rod, and the first end of the synchronous connecting rod are hinged to the protruding end of the piston rod;
the upper tool post is disposed between the hydraulic cylinder support and the guiding rod support;
the upper tool post is disposed opposite to the lower tool post;
the upper tool post is disposed between the upper beam and the lower tool post;
the sheet-supporting surface is adapted to support a metal sheet;
the beam surface is disposed parallel to the sheet-supporting surface;
the first upper connecting rod, the first lower connecting rod, the second upper connecting rod, the second lower connecting rod, and the synchronous connecting rod are disposed between the upper beam and the upper tool post;
the first upper connecting rod is disposed adjacent to the upper beam with respect to the first lower connecting rod;
the second upper connecting rod is disposed adjacent to the upper beam with respect to the second lower connecting rod;
the second end of the synchronous connecting rod is hinged to the first end of the second upper connecting rod and the first end of the second lower connecting rod;
the second end of the first upper connecting rod and the second end of the second upper connecting rod are respectively hinged to the beam surface at a first hinge joint and a second hinge joint;
the second end of the first lower connecting rod and the second end of the second lower connecting rod are respectively hinged to the first end and the second end of the upper tool post;
an angle between the first upper connecting rod and a line that is perpendicular with respect to the sheet-supporting surface is defined as β;
an angle between the first lower connecting rod and the line that is perpendicular with respect to the sheet-supporting surface is defined as $β_1$; an angle between the second upper connecting rod and the line that is perpendicular with respect to the sheet-supporting surface is defined as α; an angle between the second lower connecting rod and the line that is perpendicular with respect to the sheet-supporting surface is defined as $α_1$;
one end of the guiding rod is hinged to the upper tool post, and the other end of the guiding rod is hinged to the guiding rod support;

an angle between the guiding rod and a horizontal line that is parallel to the sheet-supporting surface is defined as φ; and the hydraulic cylinder is adapted to drive the piston rod to extend away from or move toward the hydraulic cylinder.

2. The shear of claim 1, having the following structure parameters:

a distance H from the first hinge joint connecting the first upper connecting rod and the upper beam to the second hinge joint connecting the second upper connecting rod and the upper beam is between 1000 and 5000 mm;

the first upper connecting rod and the first lower connecting rod have an equal length M, and M is between 200 and 2500 mm;

the second upper connecting rod and the second lower connecting rod have an equal length N, and N is between 200 and 2500 mm;

the angle φ between the guiding rod and the horizontal line is 5 degrees;

the angle β between the first upper connecting rod and the line that is perpendicular with respect to the sheet-supporting surface and the angle $β_1$ between the first lower connecting rod and the line that is perpendicular with respect to the sheet-supporting surface are equal, and are between −25 degrees and 25 degrees; and the angle α between the second upper connecting rod and the line that is perpendicular with respect to the sheet-supporting surface and the angle $α_1$ between the second lower connecting rod and the line that is perpendicular with respect to the sheet-supporting surface are equal, and are between −35 degrees and 35 degrees.

3. The shear of claim 1, wherein when the piston rod is driven by the hydraulic cylinder to extend away from or move toward the hydraulic cylinder support, first the first ends of the first upper connecting rod, the first lower connecting rod, and the synchronous connecting rod that are hinged to the protruding end of the piston rod are rotated around the first hinge joint by the protruding end of the piston rod;

then the second end of the synchronous connecting rod, and correspondingly, the first ends of the second upper connecting rod and the second lower connecting rod that are hinged to the second end of the synchronous connecting rod are rotated around the second hinge joint by the first end of the synchronous connecting rod; and finally the second end of the first lower connecting rod and the first cutting end of the upper tool post are moved with respect to the first hinge joint by the first end of the first lower connecting end so to change a distance between the first cutting end of the upper tool post and the lower tool post, and the second end of the second lower connecting rod and the second cutting end of the upper tool post are moved with respect to the second hinge joint by the first end of the second lower connecting end so to change a distance between the second cutting end of the upper tool post and the lower tool post; wherein the distance between the first cutting end of the upper tool post and the lower tool post and the distance between the second cutting end of the upper tool post and the lower tool post are changed so as to cut the metal sheet by one of the first cutting end and the second cutting end of the upper tool post.

* * * * *